US006721339B2

(12) United States Patent
Li et al.

(10) Patent No.: US 6,721,339 B2
(45) Date of Patent: *Apr. 13, 2004

(54) METHOD OF PROVIDING DOWNLINK TRANSMIT DIVERSITY

(75) Inventors: Quinn Li, Madison, NJ (US); Nallepilli S. Ramesh, New Providence, NJ (US)

(73) Assignee: Lucent Technologies Inc., Murray Hill, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/375,598

(22) Filed: Aug. 17, 1999

(65) Prior Publication Data

US 2003/0007463 A1 Jan. 9, 2003

(51) Int. Cl.[7] .............................. H04B 7/00; H04B 7/02; H04B 17/00; H04Q 7/00
(52) U.S. Cl. ...................... 370/535; 370/310; 370/329; 370/342; 455/101; 455/115
(58) Field of Search ................. 370/329, 330, 370/335, 336, 342, 468, 477, 521, 535, 209; 375/200, 208, 209, 141, 146, 147, 148, 130, 346, 347; 455/101, 103, 115

(56) References Cited

U.S. PATENT DOCUMENTS

| 5,623,485 | A | * | 4/1997 | Bi ............................... 370/209 |
| 5,663,990 | A | | 9/1997 | Bolgiano et al. ........... 375/347 |
| 5,805,567 | A | * | 9/1998 | Ramesh ...................... 370/204 |
| 5,923,650 | A | * | 7/1999 | Chen et al. .................. 370/331 |
| 5,930,230 | A | * | 7/1999 | Odenwalder et al. ....... 370/208 |
| 5,949,814 | A | * | 9/1999 | Odenwalder et al. ....... 375/200 |
| 6,141,542 | A | * | 10/2000 | Kotzin et al. ............... 455/101 |
| 6,154,485 | A | * | 11/2000 | Harrison ..................... 375/130 |
| 6,173,005 | B1 | * | 1/2001 | Kotzin et al. ............... 375/141 |
| 6,185,266 | B1 | * | 2/2001 | Kuchi et al. ................ 375/347 |
| 6,205,127 | B1 | * | 3/2001 | Ramesh ...................... 370/329 |
| 6,256,290 | B1 | * | 7/2001 | Ramesh ...................... 370/204 |
| 6,289,039 | B1 | * | 9/2001 | Garodnick ................... 375/143 |
| 6,317,410 | B1 | * | 11/2001 | Allpress et al. ............. 370/203 |
| 6,317,411 | B1 | * | 11/2001 | Whinnett et al. ........... 370/204 |
| 6,327,299 | B1 | * | 12/2001 | Meszko ....................... 375/149 |
| 6,356,528 | B1 | * | 3/2002 | Lundby et al. ............. 370/209 |
| 6,421,327 | B1 | * | 7/2002 | Lundby et al. ............. 370/310 |
| 6,424,619 | B2 | * | 7/2002 | Odenwalder et al. ....... 370/209 |

FOREIGN PATENT DOCUMENTS

| EP | 0 929161 | 7/1999 | ............ H04B/7/06 |
| WO | WO 9912274 | 3/1999 | ............ H04B/1/707 |

* cited by examiner

Primary Examiner—Steven H. D Nguyen
Assistant Examiner—M. Phan

(57) ABSTRACT

A transmitter for wireless communications provides multiple types of orthogonality to improve transmit diversity. Transmit diversity is improved by using both coding and carrier frequency orthogonality. Data to be transmitted is broken into four parallel channels. Two of the channels are transmitted on a first carrier signal and the other two channels are transmitted on a second carrier signal. Channels transmitted on the same carrier signal are provided with orthogonal codes so that they may be separated by a receiver. Channels transmitted on different carrier signals may be encoded with identical orthogonal codes. The modulated carrier signals are then transmitted using at least two antennas, where one antenna is used for each carrier.

12 Claims, 3 Drawing Sheets

METHOD OF PROVIDING DOWNLINK TRANSMIT DIVERSITY

BACKGROUND OF THE INVENTION

1. Field of the Invention

The present invention relates to wireless communications; more specifically, a method for providing transmit diversity.

2. Description of the Prior Art

Both transmit and receive diversity are used to counter channel fading. In the case of a receiver, diversity is provided by using two antennas that are spaced a sufficient distance apart so that only one antenna experiences a fading signal at one time. Similarly, transmit diversity is provided using two or more antennas that are spaced a sufficient distance apart so that a receiver is unlikely to have the signals from all of the antennas simultaneously fade.

FIG. 1 illustrates a prior art CDMA (Code Division Multiple Access) transmitter providing transmit diversity. Encoder 10 receives data to be transmitted and adds coding such as error correction and detecting coding. The data is then passed to interleaver 12 that reorders the data so that the loss of consecutive bits can be spread out in time when the bits are reordered at a receiver. The output of interleaver 12 is provided to demux 14 which splits the data into two parallel paths that are provided to multipliers 16 and 18. Multipliers 16 and 18 encode the data using orthogonal codes such as Walsh codes $W_{n1}$ and $W_{n2}$. It should be noted that by passing through demux 14 the data rate is decreased by one half. It should also be noted that one CDMA channel typically uses a single Walsh code such as Walsh code $W_n$. Since the data rate is decreased by one half, the Walsh code $W_n$ may be broken into two longer orthogonal Walsh Codes $W_{n1}$ and $W_{n2}$. Equations 1 and 2 illustrate the relationship between longer Walsh Codes $W_{n1}$ and $W_{n2}$ and shorter Walsh Code $W_n$.

$$W_{n1} = [W_n, W_n] \quad \text{(Eq. 1)}$$

$$W_{n2} = [W_n, -W_n] \quad \text{(Eq. 2)}$$

An example of generating two longer Walsh Codes from a single Walsh code is illustrated by Equations 3, 4 and 5.

$$W_n = 1\ 1\ -1\ -1 \quad \text{(Eq. 3)}$$

$$W_{n1} = 1\ 1\ -1\ -1\ 1\ 1\ -1\ -1 \quad \text{(Eq. 4)}$$

$$W_{n2} = 1\ 1\ -1\ -1\ -1\ -1\ 1\ 1 \quad \text{(Eq. 5)}$$

Equation 3 illustrates a simple four bit Walsh code and Equations 4 and 5 illustrate longer Walsh codes $W_{n1}$ and $W_{n2}$, respectively. It can be seen that Walsh code $W_{n1}$ is simply two repetitions of Walsh code $W_n$ and that Walsh code $W_{n2}$ is Walsh code $W_n$ followed by −1 times Walsh code $W_n$.

Returning the FIG. 1, multipliers 20 and 22 apply a pseudo-random code to each of the data paths and then the data is passed to RF sections 24 and 26. The RF sections perform functions such as modulating a carrier signal having a carrier frequency $f_1$ with the encoded data and providing sufficient amplification before transmission over antennas 28 and 30. It should be noted that the system of FIG. 1 provides transmit diversity by dividing the data into two paths that transmit at the same frequency over two antennas; however, the two paths maintain an orthogonal relationship by using different Walsh codes to encode the data.

FIG. 2 illustrates a second CDMA transmitter providing transmit diversity. As in FIG. 1, the data is processed by encoder 10 and interleaver 12 before being passed to a demux. Demux 40 divides the data into three parallel paths that are provided to multipliers 42, 44 and 46. Each of the multipliers encodes the data using Walsh code $W_n$. The data from multipliers 42, 44 and 46 is then passed to multipliers 48, 50 and 52, respectively, where the data is further encoded with a pseudo-random code. The data from multiplier 48 is provided to RF section 54 which modulates the data onto a carrier having frequency $f_1$. The data from multiplier 50 is provided to RF section 56 which modulates the data onto carrier having frequency $f_2$. The data from multiplier 52 is provided to RF section 58 which modulates the data onto a carrier having frequency $f_3$. The output of the RF sections is provided to antennas 60, 62 and 64. In this case, transmit diversity is provided using three antennas where the orthogonality of the three channels is provided by the use of different carrier frequencies.

SUMMARY OF THE INVENTION

The present invention provides a transmitter for wireless communications that has multiple types of orthogonality to improve transmit diversity. Transmit diversity is improved by using both coding and carrier frequency orthogonality. Data to be transmitted is broken into four parallel channels. Two of the channels are transmitted on a first carrier signal and the other two channels are transmitted on a second carrier signal. Channels transmitted on the same carrier signal are provided with orthogonal codes so that they may be separated by a receiver. Channels transmitted on different carrier signals may be encoded with identical orthogonal codes. The modulated carrier signals are then transmitted using at least two antennas, where one antenna is used for each carrier. It should be noted it is also possible to transmit both carriers on each of the antennas.

DETAILED DESCRIPTION

Figure 1:
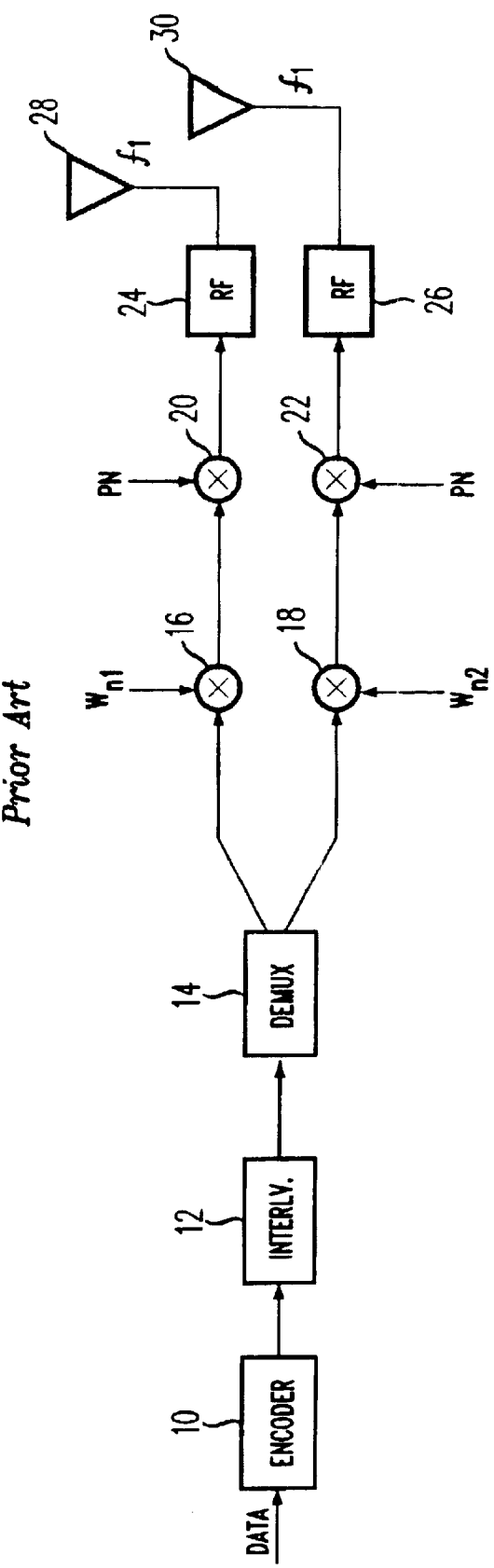
FIG. 1 illustrates a prior art CDMA transmitter having transmit diversity.
Figure 2:
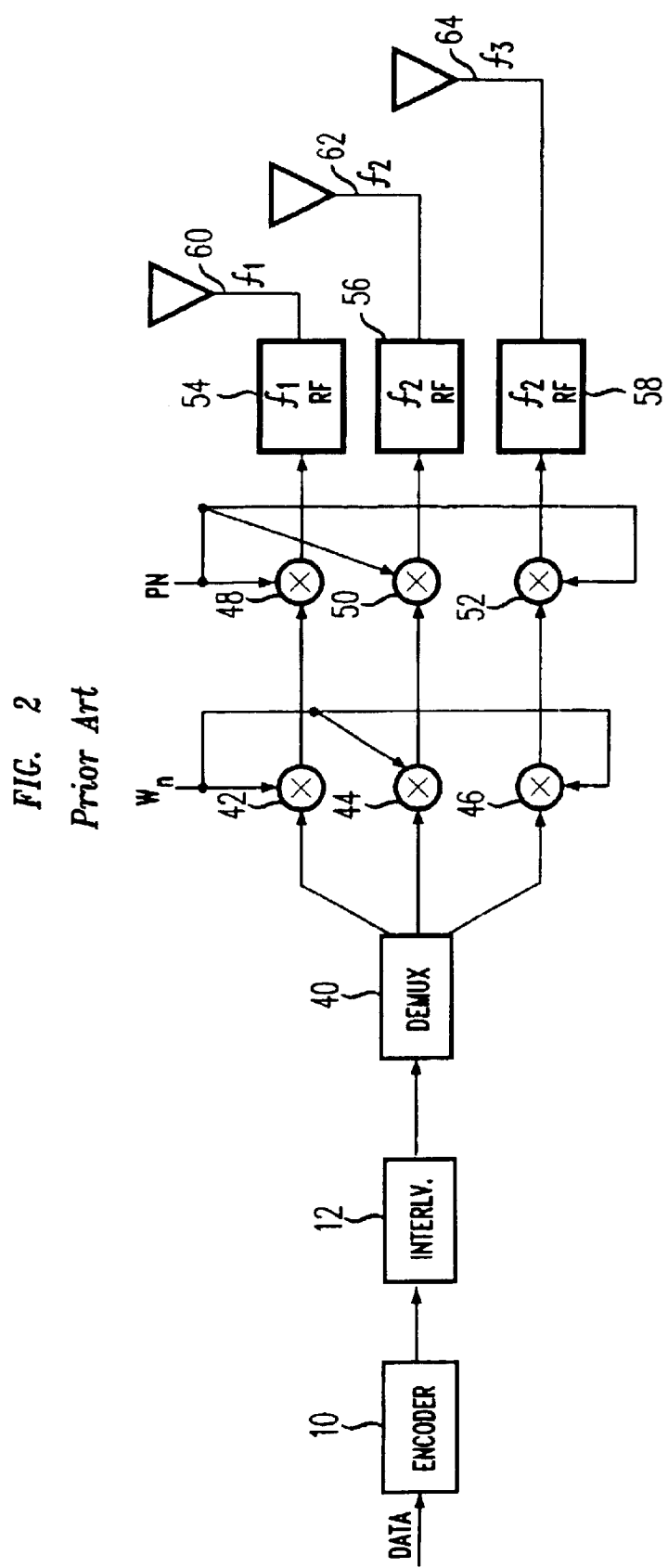
FIG. 2 illustrates a second prior art CDMA transmitter having transmit diversity.
Figure 3:
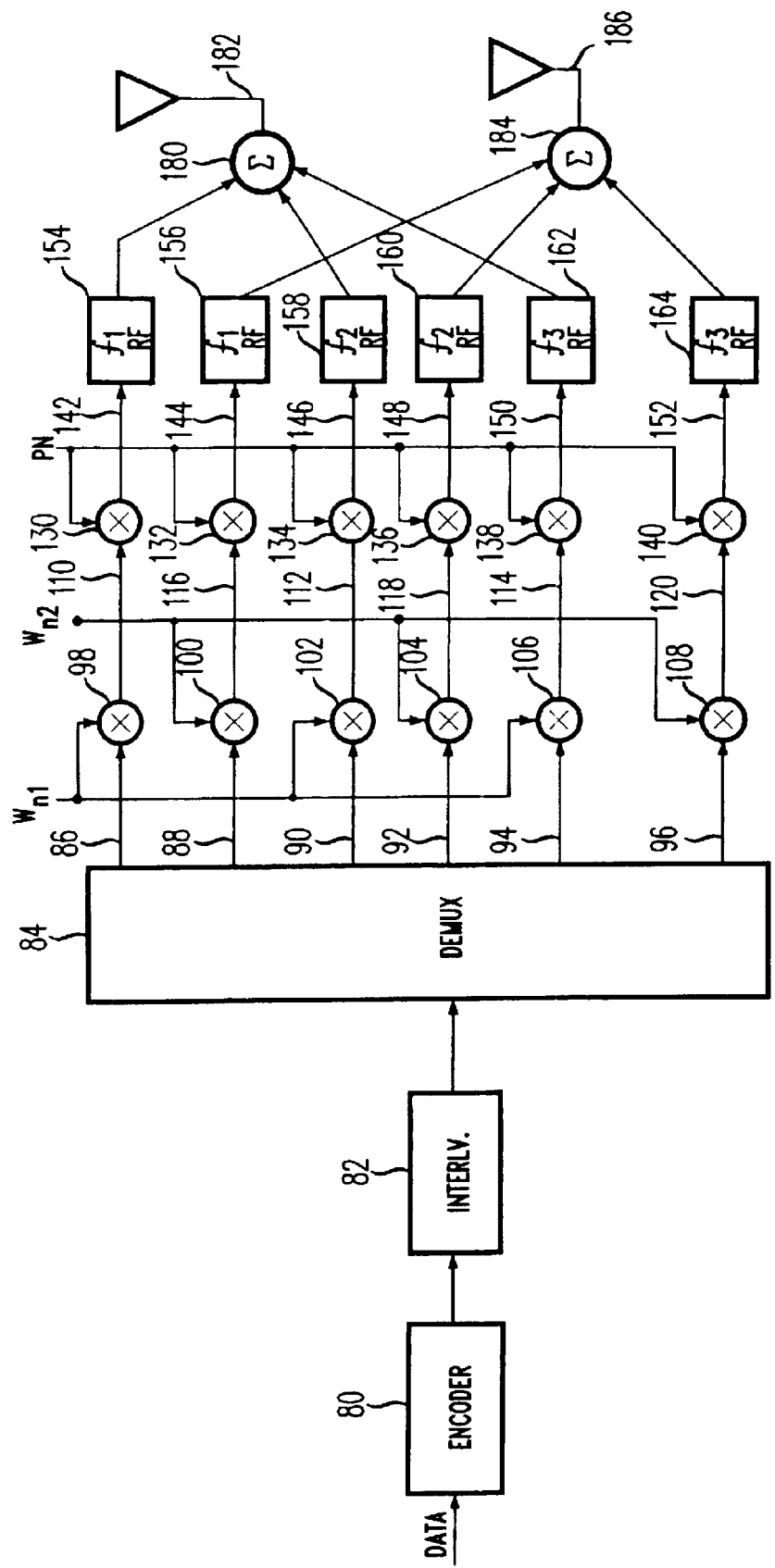
FIG. 3 illustrates a CDMA transmitter having multiple types of orthogonality.

FIG. 3 illustrates a CDMA transmitter having multiple types of orthogonality. Encoder 80 receives data and passes it to interleaver 82. Encoder 80 and interleaver 82 are similar to encoder 10 and interleaver 12 of the prior art. Demux 84 divides the data from interleaver 82 into six parallel channel paths that are time aligned. Demux 84 may be fabricated using a switch and buffers to time align the signal paths. It is also possible to fabricate demux 84 without the time alignment buffers; however, in this case the signal paths will not be time aligned. Outputs 86, 88, 90, 92, 94 and 96 of demux 84 are provided to multipliers 98, 100, 102, 104, 106 and 108, respectively. Multipliers 98 through 108 are used to encode the data using orthogonal codes such as Walsh codes. Multipliers 98, 102 and 106 encode data using Walsh code $W_{n1}$ and multipliers 100, 104 and 108 encode the data using Walsh code $W_{n2}$. Walsh codes $W_{n1}$ and $W_{n2}$ are orthogonal to each other. This results in multiplier outputs 110, 112 and 114 being encoded with the same Walsh code and being orthogonal to outputs 116, 118 and 120 which were encoded with a different Walsh code. Outputs 110 through 120 are provided to multipliers 130, 132, 134, 136, 138 and 140 that encode each of the signal paths with the pseudo-random code being used by the CDMA transmitter. After being encoded with the pseudo-random code, multiplier outputs 142, 144, 146, 148, 150 and 152 are provided to RF sections 154, 156, 158, 160, 162, and 164, respectively. RF sections 154 and 156 modulate a carrier having a frequency $f_1$ with multiplier outputs 142 and 144, respectively. RF sections 158 and 160 modulate a carrier having a frequency $f_2$ with multiplier outputs 146 and 148, respectively. RF sections 162 and 164 modulate a carrier having a frequency $f_3$ with multiplier outputs 150 and 152, respectively. The outputs of RF sections 154, 158 and 162 are provided to summer 180 for transmission over antenna 182. The outputs of RF sections 156, 160 and 164 are provided to summer 184 for transmission over antenna 186.

It should be noted that the outputs of the RF sections may be used to form a single sum that is transmitted over two different antennas or each RF section output may be transmitted over a different antenna. It is also possible to use three antennas where each antenna is used to transmit a signal with a different carrier frequency.

It should be noted that the system of FIG. 3 includes two types of orthogonality where different carrier frequencies provide a first type of orthogonality and where different orthogonal codes provide a second type of orthogonality when signals share a carrier frequency. It should be noted that orthogonal codes other than Walsh codes may be used. It should also be note that different orthogonal codes should be used when signals share a carrier frequency; however, when signals do not share a carrier frequency, the same or different orthogonal codes may be used for those channels.

It should be noted that if channels using different carrier frequencies do not reuse the orthogonal codes, two levels of orthogonality are provided. For example, two channels on carrier frequency $f_1$ use Walsh codes $W_{1n}$ and $W_{2n}$, and two channels on carrier frequency $f_2$ use Walsh codes $W_{1m}$ and $W_{2m}$. Other types and/or levels of orthogonality may be added using, for example, time orthogonality (i.e., different time slots).

FIG. 3 illustrates a system that splits a communication channel into six orthogonal channels to improve transmit diversity. It should be noted that it is possible to use more or less than six channels while maintaining multiple types of orthogonality. For example, three channels may have multiple types of orthogonality by transmitting two channels on the same carrier with different orthogonal codes, while transmitting the third channel on a carrier having a different frequency where one of the orthogonal codes used by the first two channels may be reused by the third channel.

It is also possible to apply multiple types of orthogonality to wireless communication systems other than CDMA systems to improve transmit diversity. For example, in a TDMA (Time Division Multiple Access) type system, different carrier frequencies, different time slots and/or different codes may be used to provide orthogonality between the parallel channels formed by demuxing a communication signal.

The invention claimed is:

1. A method for improving transmit diversity, comprising the steps of:
   demuxing a communication signal into at least three parallel communication channels;
   encoding each of the at least three parallel communication channels;
   transmitting at least two of the at least three parallel communication channels over a carrier signal having a first carrier frequency; and
   transmitting at least one remaining communication channel of the at least three parallel communication channels over a carrier signal having a second carrier frequency, where the communication channels being transmitted over the carrier signal having the first carrier frequency are encoded using different orthogonal codes,
   wherein the communication channel being transmitted over the carrier signal having the second carrier frequency uses a code that was used to encode at least one of the communication channels transmitted over the carrier signal having the first carrier frequency.

2. The method of claim 1, wherein the orthogonal codes are Walsh codes.

3. A method for improving transmit diversity, comprising the steps of:
   demuxing a communication signal into at least three parallel communication channels;
   encoding each of the at least three parallel communication channels;
   transmitting at least two of the at least three parallel communication channels over a carrier signal having a first carrier frequency; and
   transmitting at least one remaining communication channel of the at least three parallel communication channels over a carrier signal having a second carrier frequency, where the communication channels being transmitted over the carrier signal having the first carrier frequency are encoded using different orthogonal codes,
   wherein the communication channel being transmitted over the carrier signal having the second carrier frequency uses a code that is different than the codes used to encode the communication channels transmitted over the carrier signal having the first carrier frequency.

4. The method of claim 3, wherein the orthogonal codes are Walsh codes.

5. A method for improving transmit diversity, comprising:
   transmitting two of at least three encoded parallel communication channels over a carrier signal at a first carrier frequency, the two communication channels encoded with different orthogonal codes; and
   transmitting at least one remaining encoded communication channel of the at least three parallel communication channels over a carrier signal at a second carrier frequency, the at least one remaining communication channel encoded with a code used to encode at least one of the two communication channels transmitted at the first carrier frequency.

6. The method of claim 5, wherein one of the two communication channels encoded with different orthogonal codes is encoded with frequency orthogonality and the other encoded with code orthogonality, and the at least one remaining communication channel is encoded with frequency orthogonality or code orthogonality.

7. The method of claim 5, wherein one of the two communication channels encoded with different orthogonal codes is encoded with frequency orthogonality and the other encoded with time orthogonality, and the at least one remaining communication channel is encoded with frequency orthogonality or time orthogonality.

8. The method of claim 5, wherein one of the two communication channels encoded with different orthogonal codes is encoded with code orthogonality and the other encoded with time orthogonality, and the at least one remaining communication channel is encoded with code orthogonality or time orthogonality.

9. A method for improving transmit diversity, comprising:

transmitting two of at least three encoded parallel communication channels over a carrier signal at a first carrier frequency, the two communication channels encoded with different orthogonal codes; and transmitting at least one remaining encoded communication channel of the at least three parallel communication channels over a carrier signal at a second carrier frequency, the at least one remaining communication channel encoded with a code different than the codes used to encode the two communication channels transmitted at the first carrier frequency.

10. The method of claim 9, wherein one of the two communication channels encoded with different orthogonal codes is encoded with frequency orthogonality and the other encoded with code orthogonality, and the at least one remaining communication channel is encoded with frequency orthogonality or code orthogonality.

11. The method of claim 9, wherein one of the two communication channels encoded with different orthogonal codes is encoded with frequency orthogonality and the other encoded with time orthogonality, and the at least one remaining communication channel is encoded with frequency orthogonality or time orthogonality.

12. The method of claim 9, wherein one of the two communication channels encoded with different orthogonal codes is encoded with code orthogonality and the other encoded with time orthogonality, and the at least one remaining communication channel is encoded with code orthogonality or time orthogonality.

* * * * *